US012585559B2

(12) United States Patent
Song et al.

(10) Patent No.: US 12,585,559 B2
(45) Date of Patent: Mar. 24, 2026

(54) METHOD AND DEVICE FOR PREDICTING ERRORS IN A COMPUTING SYSTEM

(71) Applicants: Samsung Electronics Co., Ltd., Suwon-si (KR); Korea University Research and Business Foundation, Seoul (KR)

(72) Inventors: Uiseok Song, Suwon-si (KR); Seoung Bum Kim, Seoul (KR); Jaehoon Kim, Seoul (KR); Jungin Kim, Seoul (KR); Byungwoo Bang, Suwon-si (KR); Jungmin Lee, Seoul (KR); Junyeon Lee, Suwon-si (KR); Jiyoon Lee, Uijeongbu-si (KR); Jaeyoon Jeong, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 55 days.

(21) Appl. No.: 18/524,980

(22) Filed: Nov. 30, 2023

(65) Prior Publication Data

US 2024/0320111 A1      Sep. 26, 2024

(30) Foreign Application Priority Data

Mar. 23, 2023   (KR) ........................ 10-2023-0038039
Jun. 12, 2023   (KR) ........................ 10-2023-0074808

(51) Int. Cl.
  *G06F 11/22*        (2006.01)

(52) U.S. Cl.
  CPC ................................ *G06F 11/2257* (2013.01)

(58) Field of Classification Search
  CPC .. G06F 11/2257; G06F 40/242; G06F 40/284; G06F 40/30; G06F 11/008;
(Continued)

(56) References Cited

U.S. PATENT DOCUMENTS

2019/0095313 A1*  3/2019  Xu ..................... G06F 18/24323
2020/0019935 A1*  1/2020  Jan ................... G06Q 10/06311
2021/0157665 A1*  5/2021  Rallapalli ........... G06F 11/3068

FOREIGN PATENT DOCUMENTS

KR      10-2021-0011822 A      2/2021
KR      10-2022-0060350 A      5/2022

OTHER PUBLICATIONS

Lee, Yukyung, et al., "LAnoBERT: System Log Anomaly Detection Based on Bert Masked Language Model." arxiv:2111.09564v1 Nov. 18, 2021, (14 pages).
(Continued)

*Primary Examiner* — Yair Leibovich
(74) *Attorney, Agent, or Firm* — NSIP Law

(57) ABSTRACT
A method and device for predicting errors in a computing system are disclosed. The error prediction method includes: receiving log data generated by the computing system during operation of the computing system; tokenizing the log data into tokens; inputting the tokens to a discriminator model which generates scores of the respective tokens, each score corresponding to a probability that the corresponding token is an anomaly token; determining an anomaly score based on the scores; and determining a likelihood of future occurrence of an error in the computing system based on the anomaly score.

18 Claims, 11 Drawing Sheets

(58) Field of Classification Search
CPC . G06F 11/0751; G06F 11/3476; G06N 3/044;
G06N 3/045; G06N 3/08
USPC ....................................................... 714/47.3
See application file for complete search history.

(56) References Cited

OTHER PUBLICATIONS

Manolache, Andrei, et al., "DATE: Detecting Anomalies in Text via
Self-Supervision of Transformers." arXiv preprint arXiv:2104.
05591, 2021, (11 pages).
Almodovar, Crispin, et al. "Can Language Models Help in System
Security? Investigating Log Anomaly Detection using BERT."
Proceedings of the 20th Annual Workshop of the Australasian
Language Technology Association. 2022., (9 pages).
Partial European search report issued on Aug. 8, 2024, in counter-
part European Patent Application No. 24163248.8 (16 pages).

* cited by examiner

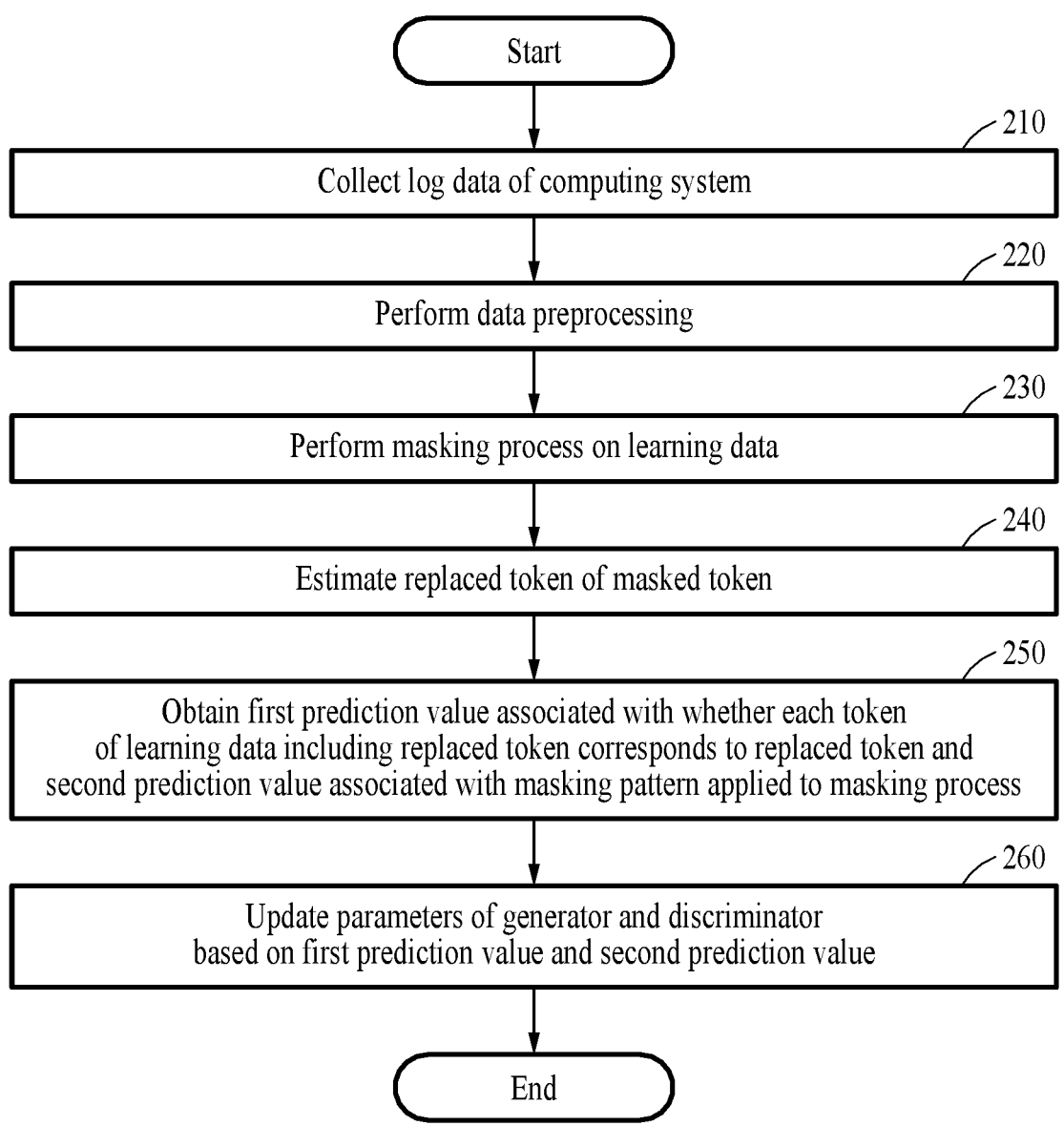

Start

210
Collect log data of computing system

220
Perform data preprocessing

230
Perform masking process on learning data

240
Estimate replaced token of masked token

250
Obtain first prediction value associated with whether each token
of learning data including replaced token corresponds to replaced token and
second prediction value associated with masking pattern applied to masking process 260
Update parameters of generator and discriminator
based on first prediction value and second prediction value End

FIG. 2

| Time (sec) | Log data | Anomaly |
|---|---|---|
| 0.0 | Starting system 2 activity accounting tool | Normal |
| 0.0 | Starting system 3 activity accounting tool | Normal |
| 0.0 | Starting system 4 activity accounting tool | Normal |
| 0.0 | Starting system 5 activity accounting tool | Normal |
| 1.0 | Removed session | Normal |
| 1.0 | The session for root using RACADM is logged off | Normal |
| ⋮ | ⋮ | ⋮ |

310

⇩

| Time (sec) | Log data | Anomaly |
|---|---|---|
| 0.0 | starting system NUM activity accounting tool | Normal |
| 0.0 | starting system NUM activity accounting tool | Normal |
| 0.0 | starting system NUM activity accounting tool | Normal |
| 0.0 | starting system NUM activity accounting tool | Normal |
| 1.0 | removed session | Normal |
| 1.0 | the session for root using racadm is logged off | Normal |
| ⋮ | ⋮ | ⋮ |

320

⇩

| Time (sec) | Log data | Anomaly |
|---|---|---|
| 0.0 | starting system NUM activity accounting tool | Normal |
| 1.0 | removed session | Normal |
| 1.0 | the session for root using racadm is logged off | Normal |
| ⋮ | ⋮ | ⋮ |

Server failed to power on because no response from Management Module for power request.

NVRM:Xid (PCI:0000:88:00): 79, pid=0, GPU has fallen off the bus.

420 server failed to power on because no response from management module for power request.

nvrm xid pci NUM NUM NUM NUM pid NUM gpu has fallen off the bus.

| Time (sec) | Log data | Anomaly |
|---|---|---|
| 0.0 | Log message 1 | Normal |
| 1.0 | Log message 2 | Normal |
| ⋮ | ⋮ | ⋮ |
| 31.0 | Log message 29 | Error |
| 50.0 | Log message 30 | Normal |
| 51.0 | Log message 31 | Normal |
| 51.0 | Log message 32 | Normal |
| 52.0 | Log message 33 | Normal |
| 55.0 | Log message 34 | Normal |
| 60.0 | Log message 35 | Normal |
| 61.0 | Log message 36 | Normal |
| 64.0 | Log message 37 | Normal |
| 70.0 | Log message 38 | Error |
| 83.0 | Log message 39 | Normal |
| 88.0 | Log message 40 | Normal |
| 90.0 | Log message 41 | Normal |

Lead time 10sec

METHOD AND DEVICE FOR PREDICTING ERRORS IN A COMPUTING SYSTEM

CROSS-REFERENCE TO RELATED APPLICATIONS

This application claims the benefit under 35 USC § 119(a) of Korean Patent Application No. 10-2023-0038039 filed on Mar. 23, 2023, and Korean Patent Application No. 10-2023-0074808 filed on Jun. 12, 2023, in the Korean Intellectual Property Office, the entire disclosures of which are incorporated herein by reference for all purposes.

BACKGROUND

1. Field

The following description relates to a technology for predicting errors in a computing system and a machine learning technology.

2. Description of Related Art

A high-performance computing (HPC) system is a powerful computing platform that processes complex computations. An HPC system generally includes high-performance hardware and software. Traditionally, an HPC system is mainly used for engineering simulations such as nuclear phenomena, fluid dynamics, particle physics, and others that require high computing performance. However, advances in artificial intelligence (AI) and information technology (IT) have increased the importance of HPC systems in processing and analyzing massive data sets and have thus increased the demand for HPC systems.

Recently, an HPC system suitable for various industrial fields has been in development. A more advanced HPC system may have a more complex structure and a gradually expanding size due to a considerable number of components. The complex structure and the increasing number of components of HPC systems has tended to increase the frequency of errors and failures occurring in HPC systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of predicting errors in a computing system includes: receiving log data generated by the computing system during operation of the computing system; tokenizing the log data into tokens; inputting the tokens to a discriminator model which generates scores of the respective tokens, each score corresponding to a probability that the corresponding token is an anomaly token; determining an anomaly score based on the scores; and determining a likelihood of future occurrence of an error in the computing system based on the anomaly score.

The method may further include performing a sharpening process on the scores, wherein the sharpening process adjusts the scores such that a standard deviation of the scores increases.

The discriminator model may be a neural network model configured to determine the score of a corresponding token based on a likelihood that the token is an anomaly token.

The determining the anomaly score may include selecting a set of highest scores from among the scores.

The determining the anomaly score further may include determining, as the anomaly score, an average value of the selected highest scores.

The determining the likelihood includes, in response to the anomaly score being greater than a threshold value, predicting future occurrence of an error in the computing system.

The method may further include performing preprocessing on the log data, wherein the preprocessing includes at least one of: replacing special characters or numbers in the log data with a token that represent all special characters or numbers; consolidating consecutive log messages determined to be duplicates after the replacing; or after the consolidating, forming log message groups of chronologically consecutive log messages, and determining likelihoods of future errors of the computing system for the respective log message groups by applying the log message groups to the discriminator model.

The generating the scores may include forming log message groups by grouping chronologically consecutive log messages included in the log data and obtaining anomaly scores respectively corresponding to the log message groups from the discriminator model by sequentially inputting each log message group to the discriminator model.

The log data may include log messages, and each log message may include respective time information about a time at which the log message is generated or a time at which an event logged to the log message occurred.

Each log message may include a status message describing a state of the computing system, a predefined code identifier corresponding to a state of the computing system, or a predefined numeric identifier corresponding to a state of the computing system.

The discriminator model may be paired with a generator model to form a discriminator-generator model, and generating, by the discriminator model, from training log data from the computing system, training tokens used for training the discriminator.

In another general aspect, a computing device for predicting errors in a computing system includes one or more processors and memory storing instructions configured to cause the one or more processors to: receive log data generated by the computing system during operation of the computing system, the log data including tokens; input the tokens to a discriminator model which generates scores of the respective tokens, each score corresponding to a probability that the corresponding token is an anomaly token; determine an anomaly score based on the scores; and determine a likelihood of future occurrence of an error in the computing system based on the anomaly score.

The instructions may be further configured to cause the one or more processors to determine the highlighted scores by adjusting the scores of the tokens such that a standard deviation of the scores of the tokens increases.

The instructions may be further configured to cause the one or more processors to determine the anomaly score based a set of highest scores selected from among the sharpened scores.

The instructions may be further configured to cause the one or more processor to, in response to the anomaly score being greater than a threshold value, predict future occurrence of an error in the computing system.

The instructions may be further configured to cause the one or more processors to preprocess the log data, wherein the preprocessing may include: replacing, with a predefined token, special characters and numbers in text of a log message in the log data; removing a word token corresponding to a stop word among word tokens of the log message; when, among time-ordered log messages included in the log data, log messages of the same text are consecutively duplicated, consolidating the duplicated log messages; or generating log message groups by grouping the time-ordered log messages.

The instructions may be further configured to cause the one or more processors to: generate log message groups by grouping time-ordered log messages included in the log data; and obtain scores respectively corresponding to the log message groups from the discriminator by sequentially inputting each log message group to the discriminator.

In another general aspect, a method includes: collecting log data of a computing system; generating training data including tokens by performing preprocessing on log data, among the collected log data, indicating normal state of the computing system; further generating the learning data by performing a masking process that precludes some of the tokens from being identifiable; estimating replacement tokens for the masked tokens using a generator model; inputting the tokens, including the replacement tokens, to a discriminator that performs inference thereon to: generate first prediction values of whether tokens of the learning data, including the replacement tokens, are replacement tokens and generate second prediction values of which masking patterns were applied during the masking process; and updating parameters of the generator model and the discriminator model based on the first prediction values and the second prediction values.

The replacement tokens may be randomly selected from a dictionary.

The generator model and the discriminator model may each include an encoder of a transformer model, and the generator may be configured to replace a masked token with a replacement token selected from among a plurality of candidate tokens and output the replacement token.

Other features and aspects will be apparent from the following detailed description, the drawings, and the claims.

BRIEF DESCRIPTION OF THE DRAWINGS

FIG. 2 illustrates an example training method according to one or more example embodiments.

FIGS. 3, 4, and 5 illustrate data preprocessing performed on log data according to one or more example embodiments.

FIG. 6 illustrates an example of data labeling performed in a learning process according to one or more example embodiments.

Figure 1:
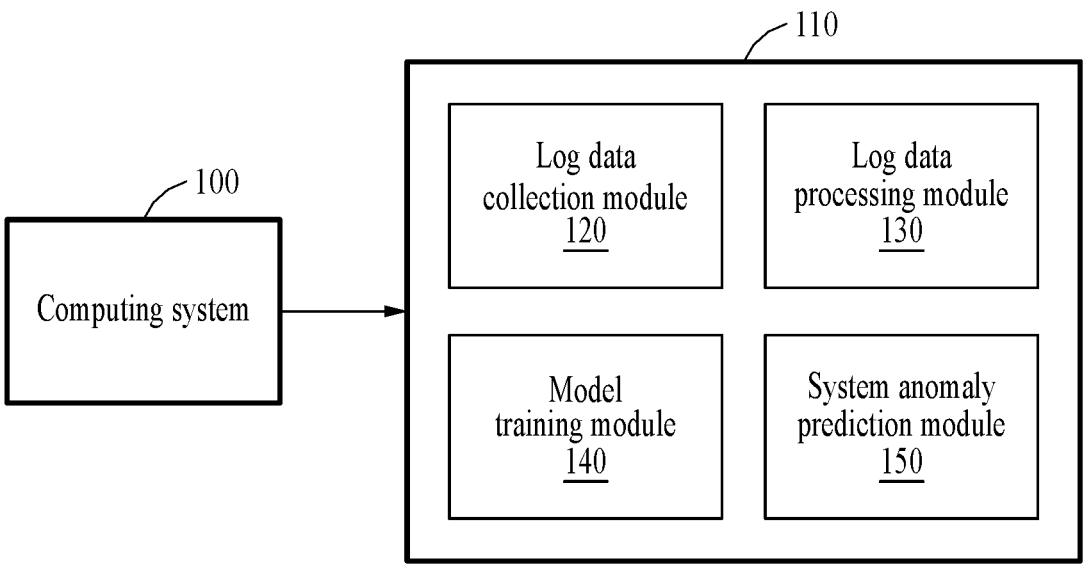
FIG. 1 illustrates an example error prediction system configured to predict errors in a computing system according to one or more example embodiments.

Throughout the drawings and the detailed description, unless otherwise described or provided, the same or like drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment, e.g., as to what an example or embodiment may include or implement, means that at least one example or embodiment exists where such a feature is included or implemented, while all examples are not limited thereto.

Hereinafter, examples will be described in detail with reference to the accompanying drawings, and like reference numerals in the drawings refer to like elements throughout.

FIG. 1 illustrates an example error prediction system configured to predict errors in a computing system according to one or more example embodiments.

Referring to FIG. 1, an error prediction system 110 may predict an error (or anomaly) in a computing system 100 or determine a likelihood of an error, and may do so based on log data of the computing system 100. "With respect the computing system 100 described herein, the terms "error" and "anomaly" are used interchangeably when discussing prediction. An error or anomaly in the computing system 100 refers to a case in which the computing system 100 operates differently than expected or planned or a case in which a failure occurs.

The computing system 100 processes data and/or performs operations or computations and in the process thereof generates log data including log messages of states and/or situations of the computing system 100. The computing system 100 may be, as non-limiting examples, a high-performance computing (HPC) system, a super computing system, a cloud system, a data center, a mobile device, a mobility device, a personal computer (PC), or the like. The computing system 100 may be any system or device that generates log data. The log data generated by the computing system 100 may include information for tracking and analyzing activities or behaviors of the computing system 100. Accordingly, the log data may be a reference for predicting the occurrence of an error in the computing system 100. The log data may include log messages and time information (e.g., timestamp) about a time at which each of the log messages is generated. A log message may include, for example, at least one of a status message describing a state of the computing system 100, a predefined code identifier corresponding to a state of the computing system 100, or a predefined numeric identifier corresponding to a state of the computing system 100. Log data may be generated by a variety of components in the computing system 100, for example an operating system, application software, system monitoring services (e.g., performance monitoring), network stack(s), device drivers, and so forth. In some implementations the log data may be centrally collected by the different system components using a logging service that logs various events to a same log file.

A log message may be, for example, a normal log message indicating that a state of the computing system 100 or a state of a specific component of the computing system 100 is normal. A log message may also be an abnormal log message indicating that there is an anomaly in the computing system 100 or in a specific component of the computing system 100. In general, the difference in content between normal log messages and abnormal log messages is somewhat arbitrary and may vary according to implementation. However log messages are identified as normal or abnormal, discrimination therebetween may be used to predict errors in the computing system 100 based on the log data. The error prediction system 110 may effectively discriminate between normal log messages and abnormal log messages and more accurately predict an error in the computing system 100 by methods described in detail below.

The error prediction system 110 may predict a likelihood that an error occurs in the computing system 100 at a future point in time (an "error occurrence likelihood"), using a deep learning-based model (e.g., a generator and a discriminator) that learn and predict based on log messages generated from various components included in the computing system 100. The error prediction system 110 may predict an error occurrence likelihood of the computing system 100 based on the text information in a sequence of log messages included in the log data.

The error prediction system 110 may include a log data collection module 120, a log data processing module 130, a model training module 140, and a system anomaly prediction module 150. Operations of the log data collection module 120, the log data processing module 130, the model training module 140, and the system anomaly prediction module 150 may be performed by one or more processors (e.g., central processing unit (CPU) and/or graphics processing unit (GPU)).

The log data collection module 120 may collect log data generated while the computing system 100 is operating (e.g., executing a workload). The log data collection module 120 may collect log data that is to be used to measure whether an error is likely to occur in the computing system 100 (a response variable) and to construct learning data for training the deep learning-based model. The log data collection module 120 may collect log data generated during operation of the computing system 100. The collected log data may be used later as an explanatory variable to be used for the deep learning-based model in an error prediction process of the computing system 100. The log data may include, for example, a log message, a log type (e.g., baseboard management controller (BMC) log, system log, and component log) indicating a type of the log message, an identifier (e.g., log ID) identifying a meaning of the log message, a log category value, metadata of an event, and the like.

The log data processing module 130 may perform data preprocessing on the log data of the computing system 100. The log data processing module 130 may divide a log message included in the log data into tokens by tokenizing a text of the log message. For example, a token may be a word or short phrase but is not limited thereto. In sum, a token may be used as a basic unit for processing log data.

The log data collected from the computing system 100 may provide status information or notifications specific to functions or equipment. The log data may include a specific unique value according to hardware characteristics of the computing system 100, and the unique value may act as noise in error prediction. For accurate error prediction, it may be desirable to generalize or remove such a unique value and unnecessary information included in the log data. The log data processing module 130 may replace a token corresponding to the unique value included in the log message with a predefined token. For example, the log data processing module 130 may replace a number included in a log message with a generalized word (e.g., NUM). The log data processing module 130 may determine that a token is unnecessary for analysis in a log message (e.g., a stop word) and remove the token. Tokens to be treated as stop words may be predetermined or may be determined by a predefined rule.

The computing system 100 may generate many log messages at the same or close times, and the log data processing module 130 may unify (consolidate) log messages having the same meaning based on meanings of the log messages. Unifying the log messages having duplicate meanings may increase the processing speed and efficiency. In addition, the log data processing module 130 may apply the sequential property of log messages to error prediction by setting log messages at various points in time to be pro-cessed. Put another way, the data processing module 130 may translate log messages from their original form to a standard form using various mapping rules. For example, log messages of a same category (although from different sources) may be translated to messages/records having a common format and having an identifier of the category.

The model training module 140 may train a deep learning-based model (or a neural network-based model) based on preprocessed log data obtained through the data preprocess-ing performed by the log data processing module 130. The model training module 140 may train the deep learning-based model only using log data indicating that the com-puting system 100 is normal. The deep learning-based model may include a generator and a discriminator. The generator may be used only in a learning/training process and may not be used for predicting an error (making an inference) in the computing system 100. The discriminator may be used for predicting an error in the computing system 100, and may also be used in the learning process.

The generator and discriminator may each include an encoder of a transformer model. The transformer model may be implemented with attention or self-attention while having an encoder-decoder structure, for example, the existing seq2seq structure. The encoder of the transformer model may include, for example, an attention block, add and norm (Add & Norm) blocks, and a feedforward block. For example, when the encoder is implemented as a layer of a neural network, the encoder may include a first layer cor-responding to the attention block and a second layer corre-sponding to the feedforward block. The attention block may determine an attention value and perform self-attention operations in parallel. A self-attention operation is an opera-tion on itself, and an attention operation obtains an attention value. The feedforward block may be a general feedforward neural network, for example. The add and norm blocks may perform a residual connection operation of adding an input and an output to each other and performing a layer normal-ization operation, e.g., normalization using an average and a variance. The attention block may determine a similarity to each of all keys for a given query and apply the determined similarity as a weight to each value mapped to a correspond-ing key. The attention block may calculate a weighted sum to which the similarity is applied and provide the result as an attention value. The query, the key, and the value described above may be, for example, vectors of all words in an input sentence (e.g., of a log message). During self-attention performed by the attention block, similarities between words in an input sentence may be determined.

The model training module 140 may perform a masking process on some tokens obtained from the preprocessed log data. The masking process may be performed to determine which tokens are selected, and consequently, determine which information (represented by tokens) is selected. The generator may receive, as an input, log data including a masked token obtained through the masking process (i.e., a token that was not masked out) and may replace (or trans-form) the masked token with (or into) another token. For example, the generator may generate a new sentence by replacing the masked token with a token (e.g., a word) in a word dictionary.

The discriminator may receive, as an input, log data including the replacement tokens that have replaced tokens (an output of the generator) and based thereon output first prediction values of the respective received tokens indicat-ing whether the received tokens are replacement tokens or original tokens. The discriminator may also output, based on the received tokens, second prediction values associated with a masking pattern applied to the masking process. An original token is a token that has not been replaced with (or transformed into) another token by the generator, i.e., a token originally included in the log data (after preprocessing and before masking and replacement). Predicting, by the discriminator, whether a token in input data is a replacement token or an original token may be referred to as a replaced token detection (RTD) task. Also, predicting, by the dis-criminator, which masking pattern was applied during the masking process (for the received log data) may be referred to as a replacement mask detection (RMD) task. The dis-criminator may have a token discrimination ability (ability to discriminate on units of tokens) through the RTD task and may have a word unit discrimination ability through the RMD task.

The model training module 140 may determine a first loss value for an output of the generator and a second loss value for an output of the discriminator. The losses may be determined using a loss function. A total loss value may be determined based on the first loss value and the second loss value. The model training module 140 may update param-eters (e.g., setting values and variables for implementing the encoder of the transformer) of each of the generator and the discriminator such that the total loss value is reduced, using, for example, a back propagation algorithm. The learning process of the generator and the discriminator is described in more detail below.

The system anomaly prediction module 150 may predict a probability of an anomaly or error occurring in the computing system 100 based on the log data of the com-puting system 100. The system anomaly prediction module 150 may predict an error occurrence likelihood of the computing system 100 using the trained discriminator. After the learning/training process for the discriminator is com-pleted, log data of the computing system 100 may be collected again by the log data collection module 120, and data preprocessing may be performed on the collected log data by the log data processing module 130. The system anomaly prediction model 150 may predict the error occur-rence likelihood (of whether an error will occur) of the computing system 100 after a specific lead time elapses, using the discriminator.

The preprocessed log data (input tokens) obtained through the data preprocessing may be input to the discriminator, and the discriminator may output scores of the respective input tokens of the log data, where the score of an input token corresponds to how likely the input token is an anomaly token (i.e., represent an anomaly or error). For example, the discriminator may output, as the score of an input token, a probability value that the input token of the log data is not an original token or a probability value that the input token of the log data is an original token. An anomaly token, as used herein, is a token associated with an abnormal (or error) state of the computing system 100, and may be discriminated from tokens of the log data corresponding to the computing system 100 being in a normal state.

The system anomaly prediction module 150 may determine, based on scores of tokens, an anomaly score that then used for predicting the error occurrence likelihood of the computing system 100. The system anomaly prediction module 150 may perform a highlighting process on the scores of the tokens to determine highlighted scores, and determine an anomaly score based on the highlighted scores. The highlighting process may include a sharpening process that adjusts a score of a higher value to be higher and adjusts a score of a lower value to be lower. Through the sharpening process, tokens of log data obtained in a normal state and tokens of log data obtained in an abnormal state may be more effectively discriminated.

The system anomaly prediction module 150 may determine the anomaly score based on, among the highlighted scores, those scores having a value greater than or equal to a preset reference value or those in a preset number of top scores (top-N scores). For example, the system anomaly prediction module 150 may determine, as the anomaly score, (i) an average value of the scores (e.g., sharpened scores) that are greater than or equal to the reference value or (ii) an average value of the preset number of top scores (e.g., sharpened scores). The system anomaly prediction module 150 may estimate the error occurrence likelihood of the computing system 100 based on the anomaly score. For example, when the anomaly score is greater than a threshold value, the system anomaly prediction module 150 may predict that an error will occur in the computing system 100. When the anomaly score is less than or equal to the threshold value, the system anomaly prediction module 150 may predict that no error will occur in the computing system 100.

The error prediction system 110 may solve a problem that is difficult for humans, namely, to predict an error that may occur in a process of operating the computing system 100. Prediction may be based on, for example, supercomputer log data using artificial intelligence (AI) technology. The error prediction system 110 may train a deep learning-based model using log data of the computing system 100 and detect an abnormal pattern of the computing system 100 using the trained deep learning-based model to predict in advance an occurrence of an error in the computing system 100. An error or anomaly may be predicted even when the log data otherwise indicates normal operation of the computing system 100, that is to say, when there is no direct indication in the log data of an error or anomaly. The error prediction system 110 may increase error prediction accuracy by optimizing log data (e.g., the highlighting process, using only some scores having top values among scores of tokens, and the like) according to characteristics of the log data of the computing system 100. Error prediction may be improved even when there is not a great difference in text or expression between a normal log message and an abnormal log message and when there are not many words to discriminate between the normal log message and the abnormal log message.

FIG. 2 illustrates an example training method according to one or more example embodiments. The training method may be performed by a training device described herein (e.g., a training device 1100 of FIG. 11).

Referring to FIG. 2, in operation 210, the training device may collect log data of a computing system (e.g., the computing system 100 of FIG. 1). The training device may collect log data generated during an operation of the computing system, e.g., when executing a workload. The log data may include, for example, log messages. Each log message may express a state of the computing system as a text, a time at which the log message is generated, an identifier (e.g., an ID) for identifying a meaning of the log message, a source of the log message, information or metadata provided by the source of the log message that pertains to the log message, and/or a type of the log message, to name some examples.

In operation 220, the training device may perform data preprocessing on the log data. At least some of the log data that the training device uses to form learning data (by preprocessing) may indicate a normal state of the computing system.

In an example embodiment, the training device may perform at least one of, for example: replacing text of special characters or numbers in log messages with predefined tokens; removing word tokens of stop words among word tokens of the log messages; when log messages in the log data have the same text (e.g., repetitions of the same message) are consecutively/adjacently duplicated among log messages generated by time (or time-wise log messages), unifying the duplicated log messages; or generating log message groups by grouping the time-wise log messages.

In the log data, there may be consecutive log messages with the same content. However, it is not necessary to analyze all the consecutive log messages with the same content, and thus the training device may unify (consolidate) the consecutive log messages with such duplicate content. Each log message may include special characters and numbers. Predicting an occurrence of an error in the computing system is based on information about log messages and contextual information between the log messages and, in this case, special characters and numbers in the log messages may be a hindrance to training a deep learning-based model. Accordingly, the training device may replace a text corresponding to a number among texts of a log message with a predefined token, and treat the token as a stop word to remove an unnecessary token for training or learning from a training target. Such a data preprocessing process may reduce a loss of information in log messages and enable effective training and learning of the deep learning-based model. By reducing tokens of log messages in this way, log messages with the same important may become the same in terms of their final token content, regardless of insignificant textual differences.

Although tokenization and token replacement has been described, the use of tokens per se is not required. The more general technique is to replace pieces of information (parameters) that might vary among log messages that represent a same event with general pieces of information. The token replacement technique is just one many that may be used to generalize messages.

In operation 230, the training device may perform a masking process on the learning data. The training device may generate learning data including a masked token (a token that has made it through a mask) obtained by performing the masking process that precludes (masks out) some of the tokens included in the learning data from being identified. For example, the training device may apply, to the learning data, a masking pattern that is randomly selected from among a plurality of predefined masking patterns. The masking pattern may be a pattern indicating which token is to be masked through the masking process among the tokens included in the learning data and the number of tokens to be masked.

In operation 240, the training device may use a generator to generate (estimate) replacement tokens to replace masked tokens in the learning data. In this case (when performing token replacement), log data obtained only when the computing system is normal (not having an anomaly or error) may be used as the learning data and. That is, token replacement may only be performed for tokens that are associated with normal operation of the computing system. For example, learning data in which tokens of log messages are connected in chronological order may be input to the generator. The learning data input to the generator may include the masked tokens. The generator may replace a masked token with a replacement token that is selected from among a plurality of candidate tokens and output the replacement token. For example, the generator may newly generate a sentence by replacing the masked token with the replaced token. The replacement tokens may be words in a learned word dictionary. In some examples, the replacement tokens may be randomly selected.

In operation 250, the training device may obtain first and second prediction values for each of the respective tokens in the learning data (which includes replacement tokens). The first prediction value, obtained by inference, corresponds to how likely it is that a corresponding token is a replacement token. The second prediction value corresponds to how likely it is that a given masking pattern has been applied during the masking process. The first and second prediction values may be obtained by using a discriminator that performs inference on the learning data (which includes replacement tokens). A sentence (in the form of tokens) generated by the generator may be input to the discriminator. The discriminator may predict whether each token included in the learning data is an original token or a replacement token and may predict which masking pattern was applied to the learning data.

In operation 260, the training device may update parameters (e.g., weights of nodes) of the generator and the discriminator based on the first prediction values and the second prediction values. The training device may continuously and repeatedly update or optimize the deep learning-based model (e.g., the generator and the discriminator) based on an objective function. The objective function may be determined by a loss function or a cost function. The training device may determine a first loss based on an output of the generator and determine a second loss and a third loss based on a first prediction value and a second prediction value output by the discriminator, respectively. The training device may determine a final loss as a weighted sum of the first loss, the second loss, and the third loss, and update the parameters of the generator and the discriminator such that the final loss is reduced, using a backpropagation algorithm. Such a learning process may allow the generator and the discriminator to learn characteristics of log data corresponding to normal state of the computing system.

Figure 4:
Figure 5:
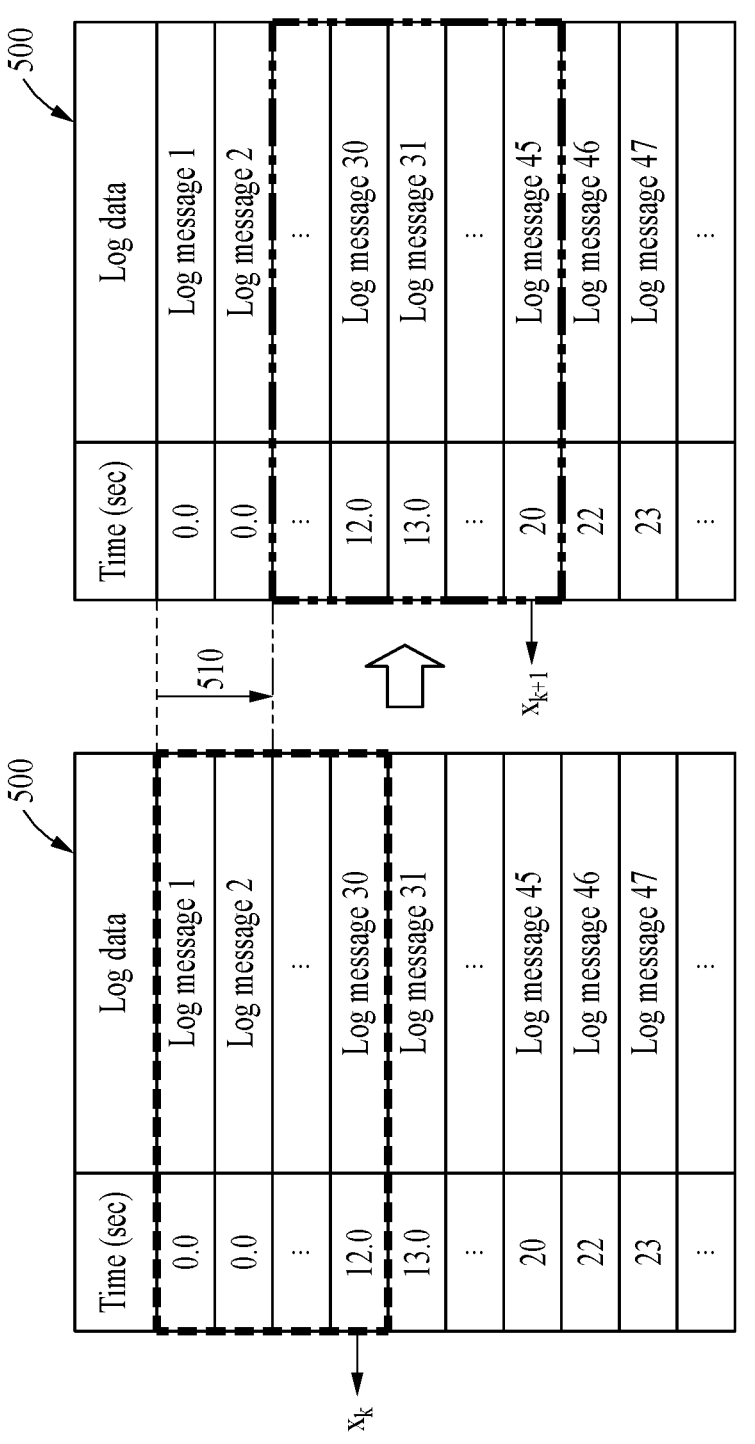

FIGS. 3, 4, and 5 illustrate data preprocessing performed on log data according to one or more example embodiments.

FIG. 3 shows example log data 310 obtained from a computing system for which error/anomaly prediction is to be performed. The log data 310 includes log messages in chronological of the time that they were generated (time-wise log messages). The log messages may include special characters and/or numbers. The special characters and numbers in the log messages may be replaced with predefined tokens, and word tokens corresponding to stop words among word tokens of the log messages may be removed. A result obtained through such data preprocessing performed on the log data 310 is shown as log data 320. Referring to the log data 320, the numbers (e.g., 2, 3, 4, and 5) in the log messages are replaced with the token "NUM." Also, when the log messages are generated in English, uppercase letters may be collectively transformed into lowercase letters or lowercase letters into uppercase letters. In the log data 320, uppercase letters are transformed into lowercase letters. Subsequently, when log messages with the same text are consecutive duplicates in the log data, the consecutive duplicated log messages may be deleted (reduced to a single log message). For example, there are four log messages with the same text "starting system NUM activity accounting tool" that are consecutively duplicated in the log data 320, and the four log messages may be unified and three duplicated log messages may be deleted. Log data 330 is an example of deleting such duplicated log messages from log data 320.

FIG. 4 shows an example log message 410 obtained from a computing system. The log message 410 may include content in the form of a sentence that may be preprocessed into tokens. As shown in FIG. 4, a preprocessed log message 420 may be obtained by replacing numbers included in the log message 410 with a predefined token "NUM," and removing special characters (e.g., colon (:), comma (,), and equal sign (=)) or replacing them with whitespace. In addition, uppercase letters included in the tokens of the log message 410 may be transformed into lowercase letters.

As shown in the examples of FIG. 4, the log messages may have labels indicating whether they are associated with a normal state of the computing system or whether they are associated with an abnormal (error/anomaly) state of the computing system.

FIG. 5 shows (as dashed-line boxes) log message groups formed for chronological log messages included in log data 500. Such message groups may function as units of data for processing. For example, log messages listed in chronological order may be grouped into a predefined number of log message groups which may overlap each other chronologically. The log messages may be grouped according to a stride between the log messages for determining a subsequent log message group. The grouping of log messages may be referred to as "windowing," and each of the log message groups may be referred to as a "window." In this case, the number of log messages included in a log message group may be referred to as a "window size," and a stride between log messages for determining a subsequent log message group may be referred to as a "stride of a window." In some implementations, the window size may be defined as a length of time rather than a number of log messages.

As shown in FIG. 5, in an example, the window size may be 30 messages and the window stride may be 15 messages. A first log message group xx may be formed or defined. Subsequently, by a stride 510 (e.g., 15), a specific number (e.g., 30) of log messages may be grouped, and a second log message group $X_{k+1}$ may be generated. Through this process, sequentially overlapping log message groups may be formed for the log messages included in the log data 500.

The processing of log data described above with reference to FIGS. 3, 4, and 5 may be performed both (i) in a process of predicting an occurrence of an error in a computing system, and (ii) in a learning/training process (both are described herein).

FIG. 6 illustrates an example of labeling training data to be used in a learning (training) process according to one or more example embodiments.

Generally, in the prediction of an error occurrence likelihood of a computing system, there may be some signs that are prognostic of an occurrence of an error in the computing system, and the signs may occur at different times depending on a type of error or defect occurring in the computing system, a type of computing system, a type of components included in the computing system, and a type of log message, for example. Therefore, using a model that predicts an error after a fixed predetermined time elapses may degrade error prediction for versatile (highly changing) applications and may be specialized for predicting only a specific type of error. In addition, to change a timespan for predicting an occurrence of an error (i.e., the timing of predicting errors), it may be necessary to retrain the model. For such an issue, error occurrence likelihoods for multiple points in time (multiple timespans) may be predicted based on a last point in time of a log message used for predicting an error. To this end, a training device may form a correct answer, or ground truth (GT), using two or more fixed intervals in a learning/training process. For example, when a time difference to a point in time (timespan) of the GT is a lead time and the lead time is set to 10 seconds, 30 seconds, 60 seconds, 180 seconds, and 300 seconds, the intervals of the GT may include (10, 30) seconds, (30, 60) seconds, (60, 180) seconds, (180, 300) seconds, and (300, 420) seconds, respectively. For example, when the lead time is 10 seconds, a corresponding prediction may indicate whether an error occurs during a time between (i) 10 seconds after a point in time at which a last log message included in a log message group is generated and (ii) 30 seconds. The training device may set, as a label of a prediction result value corresponding to learning data, a status value indicated by one or more log messages that are selected based on the lead time from among time-wise log messages. Each instance (training sample) included in the learning/training data may include one log message group of a fixed number (e.g., 30) of log messages, and, in association with the sample/instance, a target value (or label) may be set to be normal or abnormal based on whether there is an indication of an error in the computing device within a set time interval after the lead time.

Referring to FIG. 6, an error occurrence likelihood (e.g., for training) may be estimated based on log messages included in a current log message group 610. Whether an error occurs in the computing device within a set time interval 630 after a preset lead time 620 (e.g., 10 seconds) from a last log message included in the log message group 610 may be used as GT for the estimated error occurrence likelihood. For example, whether an error occurs during the time interval 630 from (i) 10 seconds after a point in time at which the last log message (e.g., Log message 30) included in the current log message group 610 is generated to (ii) 30 seconds may be used as the GT. Through such a process, labeling may be performed on learning data.

Figure 7:
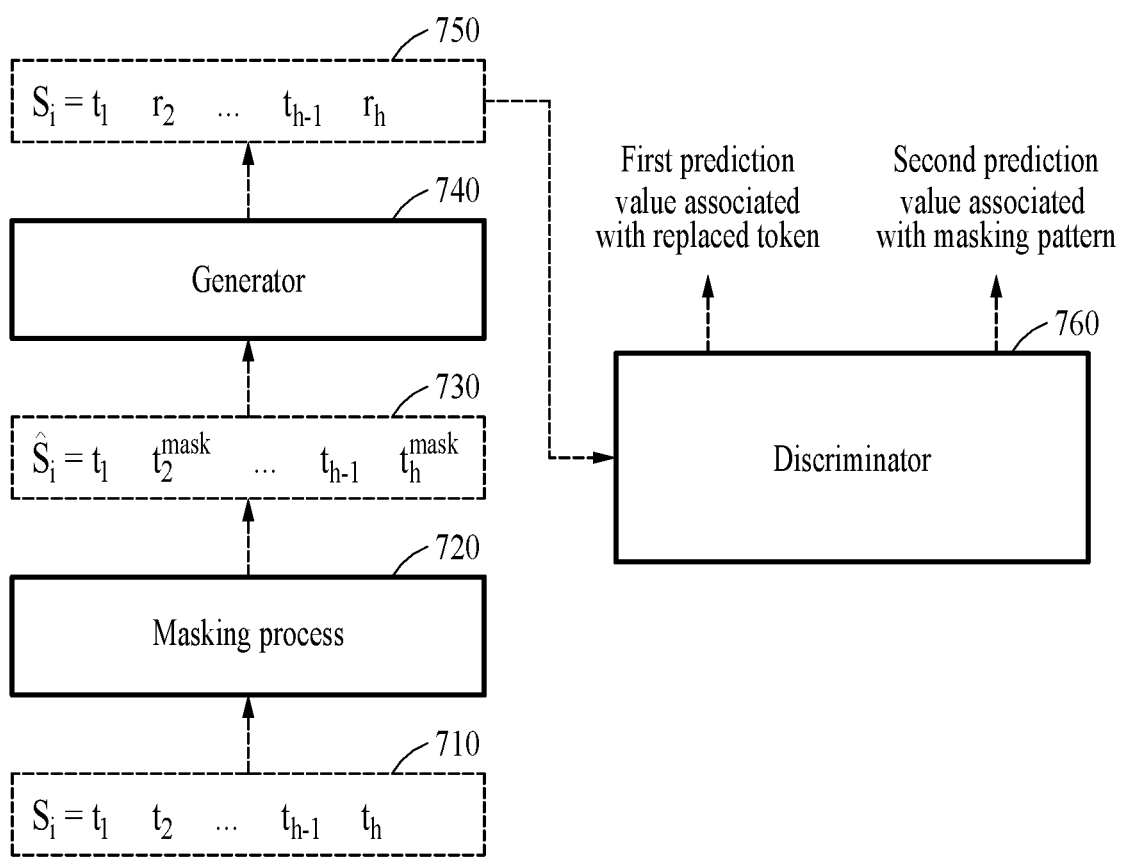
FIG. 7 illustrates an example of obtaining a first prediction value and a second prediction value from learning data using a generator and a discriminator according to one or more example embodiments.

FIG. 7 illustrates an example of obtaining a first prediction value and a second prediction value from learning data using a generator and a discriminator according to one or more example embodiments.

Referring to FIG. 7, in a learning process, data preprocessing may be performed on log messages of a computing device, and learning data 710 may be determined. A masking process 720 may be performed on the learning data 710, and some tokens $t_2$ and $t_h$ among tokens $t_1$, $t_2$, . . . , $t_{h-1}$, and $t_h$ in sentence Si included in the learning data 710 may be replaced with masked tokens $$t_2^{mask} \text{ and } t_h^{mask},$$

which are not inherently identifiable as masked tokens. Accordingly, learning data 730 including the masked tokens $$t_2^{mask} \text{ and } t_h^{mask}$$

may be generated. For example, a token to be masked may be randomly determined from among the tokens $t_1$, $t_2$, . . . , $t_{h-1}$, and $t_h$. A masking pattern that is randomly selected from among a plurality of predefined masking patterns may be used for the masking process 720.

The learning data 730 may be input to a generator 740, and the generator 740 may estimate replacement tokens $r_2$ and $r_h$ of the masked tokens $$t_2^{mask} \text{ and } t_h^{mask}$$

included in the learning data 730. Accordingly, learning data 750 in which the masked tokens $$t_2^{mask} \text{ and } t_h^{mask}$$

are replaced with the replacement tokens $r_2$ and $r_h$ may be generated through the generator 740, which replaces the masked tokens $$t_2^{mask} \text{ and } t_h^{mask}$$

with words (e.g., random words) in a predefined word dictionary. The learning data 750 may be provided in the form of a sentence. The generator 740 may include an encoder of a transformer model (a known type of neural network).

The learning data 750 may be input to a discriminator 760, and the discriminator 760 may perform inference on the learning data 750 and output inferred first prediction values associated with whether each of the respective tokens $t_1$, $t_2$, . . . , $t_{h-1}$, and $t_h$ of the learning data 750 (including the replacement tokens $r_2$ and $r_h$) corresponds to a replacement token. The discriminator may further output second prediction values of the respective tokens $t_1$, $t_2$, . . . , $t_{h-1}$, and $r_h$ associated with the masking patterns applied to the masking process 720. For a given token, the first prediction value and the second prediction value may be in the form of a vector value, a probability value, or a score. The discriminator 760 may include encoders of a transformer model, with a first head outputting the first prediction value and a second head outputting the second prediction value. The first head and the second head are heads in the structure of the transformer model.

A training device may define a total loss based on a first, second, and third loss. The first loss is based on an output of the generator 740, the second loss is based on the first prediction value output by the discriminator 760, and the third loss based on the second prediction value output by the discriminator 760. The training device may update parameters of the generator 740 and the discriminator 760 (e.g., weights of nodes in layers) such that a final loss decreases, using a backpropagation algorithm. The first loss may reflect how close the generator 740 determines the replaced tokens $r_2$ and $r_h$ (for example) are to the original tokens $t_2$ and $t_h$. The second loss may reflect how accurately the discriminator 740 discriminates between a replacement token and an original token with respect to the learning data 750. The third loss may reflect how accurately the discriminator 740 discriminates the masking pattern used in the masking process 720.

Figure 8:
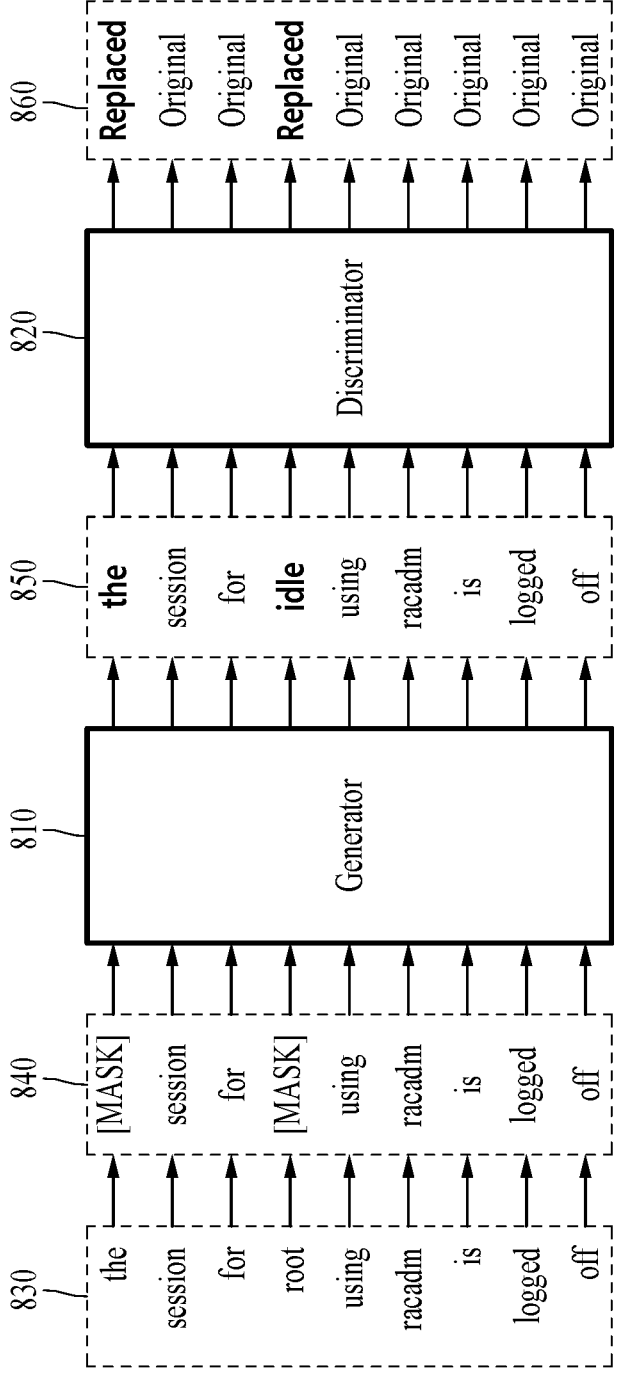
FIG. 8 illustrates example operations of a generator and a discriminator according to one or more example embodiments.

FIG. 8 illustrates example operations of a generator and a discriminator according to one or more example embodiments.

Referring to FIG. 8, learning data 830 is given to train a generator 810 and a discriminator 820. The learning data 830 may be divided into, for example, word-unit tokens. A training device may perform a masking process according to a determined masking pattern and generate learning data 840 including masked tokens. As shown in FIG. 8, the masking process may be performed on tokens of "the" and "root." The learning data 840 including the masked tokens may be input to the generator 810, and the generator 810 may estimate replaced tokens for the masked tokens. For example, the generator 810 may estimate "the" as a replacement token for a masked token obtained by the masking process performed on "the", and may estimate "idle" as a replacement token for a masked token obtained by the masking process performed on "root." For the masked token "root," the generator 810 may incorrectly estimate the replacement token.

In this case, learning data 850 in which the masked tokens included in the learning data 840 are replaced with the replacement tokens estimated by the generator 810 may be input to the discriminator 820, and the discriminator 820 may output estimates 860 indicating which of the tokens included in the learning data 850 are replacement tokens estimated by the generator 810 and which are original tokens. Also, the discriminator 820 may estimate a masking pattern applied when generating the learning data 840. For example, the discriminator 820 may estimate the masking pattern that is selected when generating the learning data 840 from among a plurality of predefined different masking patterns.

Figure 9:
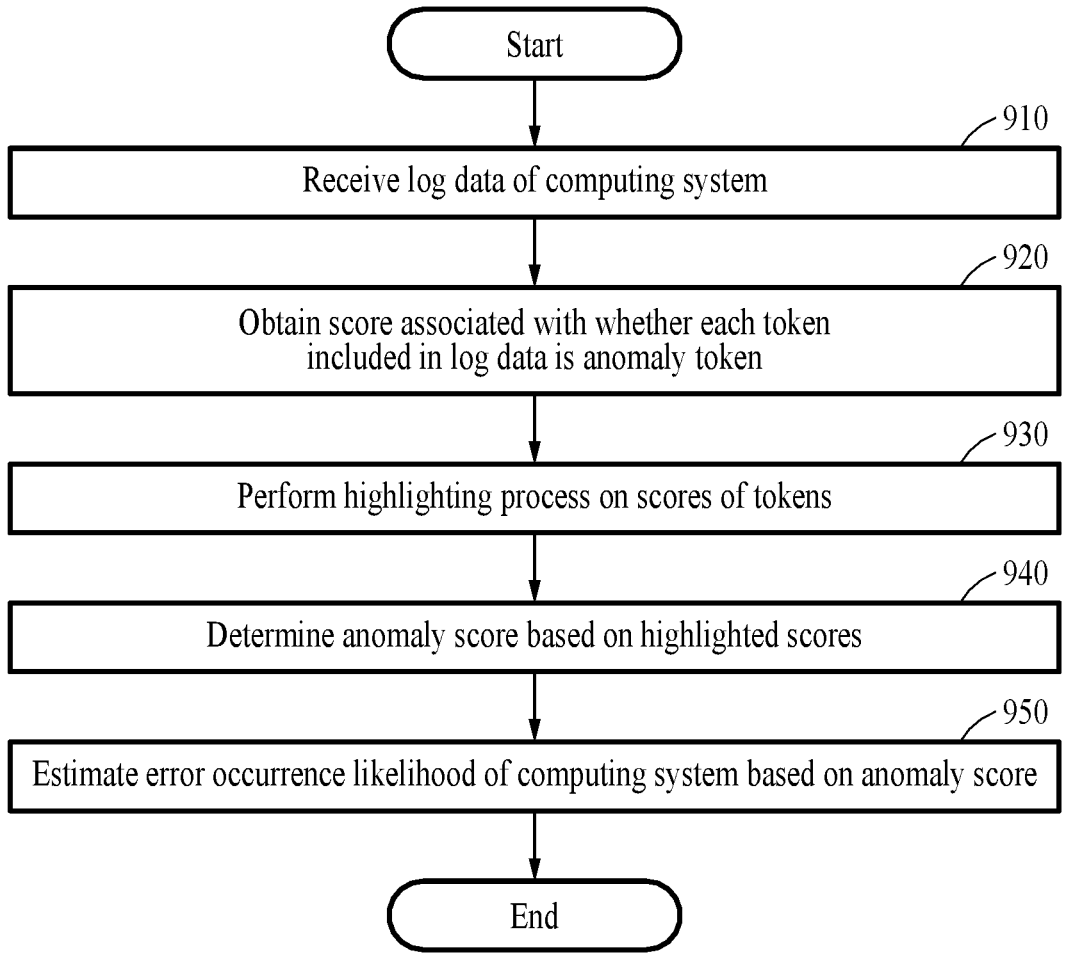
FIG. 9 illustrates an example error prediction method of predicting errors in a computing system according to one or more example embodiments.

FIG. 9 illustrates an example error prediction method of predicting errors in a computing system according to one or more example embodiments. The error prediction method may be performed by an error prediction device described herein (e.g., an error prediction device 1200 of FIG. 12).

Referring to FIG. 9, in operation 910, the error prediction device may receive log data generated during an operation of a computing system. The error prediction device may receive log messages sequentially generated according to time in the computing system and store the received log messages.

The error prediction device may perform data preprocessing on the log data. The data preprocessing may include, for example: replacing a text corresponding to at least one of special characters and numbers among texts of the log messages included in the log data with predefined tokens; removing a word token corresponding to a stop word from among word tokens of a log message; when log messages of the same text are consecutively duplicated among time-wise log messages included in the log data, consolidating the duplicated log messages; and/or a process of grouping the time-wise log messages and generating log message groups. For details of the data preprocessing of log data, reference may be made to the data preprocessing described above regarding operation 220 with reference to FIG. 2.

In operation 920, the error prediction device may obtain scores associated with whether each of the tokens included in the log data is an anomaly token using a discriminator. In this case, the log data, which may be log data obtained through the data preprocessing, may include tokenized log messages. The score may be a probability value, for example. The error prediction device may group the time-wise log messages into groups and sequentially input each of the log message groups to the discriminator to obtain the scores corresponding to the respective log message groups from the discriminator. For example, data connected to a specific number (e.g., 30) of log messages included in a log message group may be input to the discriminator. When the log data is collected for a predetermined time interval, log data groups may be sequentially generated, and the log data groups may be sequentially input to the discriminator in the sequential order in which the log data groups are generated.

In an example embodiment, the discriminator may be a model (e.g., a neural network) that determines the score that is (or is based on) a likelihood that a token included in the log data is an anomaly token. The score may correspond to a value output from a first head of the discriminator (e.g., the discriminator 760 of FIG. 7) that outputs a first prediction value from the discriminator. The discriminator may be trained, during a learning process, to effectively discriminate tokens replaced by a generator from log data obtained when the computing system is in a normal state, and thus, when a token that is a target of discrimination is estimated as a token (or an anomaly token) of log data obtained when the computing system is in an error state or in a state in which an occurrence of an error is expected, assign a score of a high value to the token. In contrast, when a token that is a target of the discrimination is estimated as a token of log data obtained when the computing system is in the normal state, the discriminator may assign a score of a low value to the token.

In operation 930, the error prediction device may determine highlighted (sharpened) scores obtained through a highlighting process performed on the scores of the tokens. The error prediction device may determine the highlighted scores by adjusting the scores of the tokens in a way that increases the standard deviation therebetween. Since there may not be great differences between (i) words or expressions of a log message corresponding to the normal state and (ii) a log message corresponding to the error state, it may be desirable to perform the highlighting process to further amplify the differences. The highlighting process may contribute to an effective discrimination between a sequence of log messages corresponding to the normal state of the computing system and a sequence of log messages corresponding to the error state (or an abnormal state) of the computing system. The highlighting process may be performed based on Equation 1, for example.

$$\text{sharpen } (S, T) := \frac{t_i^{\frac{1}{T}}}{\sum_{j=1}^{h} t_i^{\frac{1}{T}}}$$

<div align="right">Equation 1</div>

In Equation 1, S denotes a log message group subject to the highlighting process (e.g., a sharpening process), and $t_1$ denotes an anomaly score of an $i$-$t_h$ token included in the log message group (the sharpen(S,T) function may be computed for each of h tokens). j is an index for summing over each of the h tokens, and T denotes a temperature scaling parameter. During learning, the temperature scaling parameter T may be set to 1, and then an anomaly score may be determined in an actual error prediction step to estimate an anomaly probability of a given input. In this case, each anomaly score t may be exponentiated by 1/T (power). The temperature scaling parameter may increase the distance between an anomaly score of an in-distribution sample and an anomaly score of an out-of-distribution sample, thus contributing to the improved discrimination of the out-of-distribution sample. The temperature scaling parameter value may be preset to a value suitable to a particular application or implementation, sharpen(S, T) denotes a result of the highlighting process. The highlighting process may assign a higher score value to tokens already having a high score and assign a lower score value to tokens already having a low score.

In operation 940, the error prediction device may determine an anomaly score based on the highlighted scores obtained through the highlighting process. For example, the error prediction device may determine the anomaly score based on some (e.g., ¼ of a total number of scores) of top scores selected in an order starting from the highest score among the highlighted scores. The error prediction device may determine the anomaly score by selecting only some tokens closely related to an error occurrence likelihood of the computing system. For example, the error prediction device may use an average of the selected scores as the anomaly score.

In operation 950, the error prediction device may estimate an error occurrence likelihood of the computing system based on the anomaly score. For example, in response to the anomaly score being greater than a threshold value, the error prediction device may predict an occurrence of an error in the computing system. In response to the anomaly score being less than or equal to the threshold value, the error prediction device may predict no occurrence of an error in the computing system. A future time interval subject to the prediction of the error occurrence likelihood (i.e., a time interval during which an error is predicted to occur) may correspond to a defined time interval after a specific lead time from a generation time of a last log message included in the log data used for error prediction.

Figure 10:
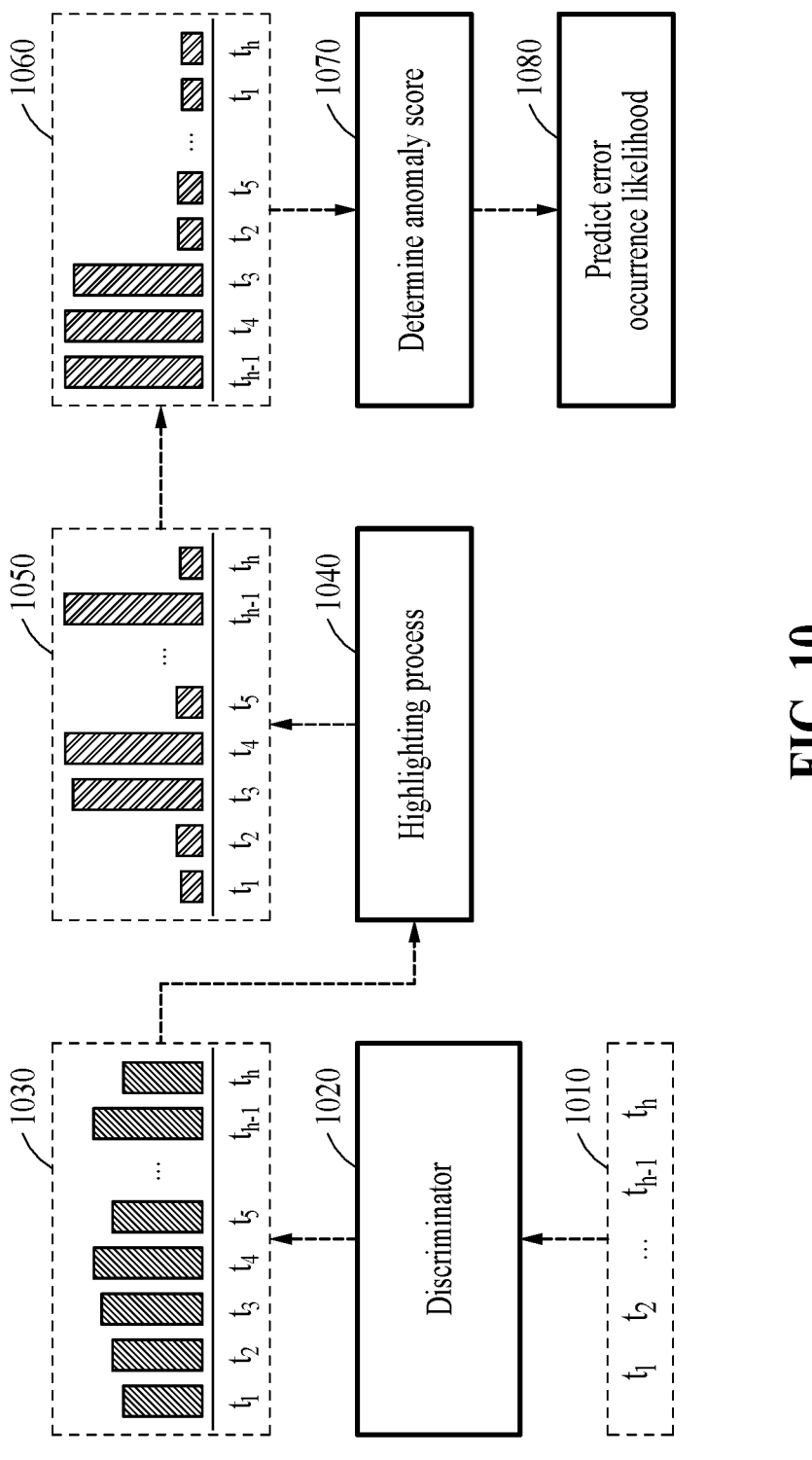
FIG. 10 illustrates an example of predicting an error occurrence likelihood of a computing system from log data using a discriminator according to one or more example embodiments.

FIG. 10 illustrates an example of predicting an error occurrence likelihood of a computing system from log data using a discriminator according to one or more example embodiments.

Referring to FIG. 10, log data 1010 generated by a computing device may be received in a process of predicting an error in a computing system. The log data 1010 may be data obtained through data preprocessing described above with reference to FIG. 9 and divided into token units. The log data 1010 may be divided into a plurality of tokens $t_1$, $t_2$, . . . , $t_{h-1}$, and $t_h$.

The log data 1010 may be input to a discriminator 1020, and the discriminator 1020 may output scores 1030 associated with whether the tokens included in the log data 1010 are an anomaly token. The scores 1030 may be, for example, probability values indicating that the tokens $t_1$, $t_2$, . . . , $t_{h-1}$, and $t_h$ respectively correspond to the anomaly token. For example, when a token is estimated to be highly likely to correspond to the anomaly token, a high value may be assigned as a score of the token, and when a token is estimated to be less likely to correspond to the anomaly token, a low value may be assigned as a score of the token.

An error prediction device may determine highlighted scores 1050 obtained through a highlighting process 1040 performed on the scores 1030 of the tokens. The error prediction device may determine the highlighted scores 1050 by adjusting the scores 1030 of the tokens such that a standard deviation of the scores 1030 increases. Through the highlighting process, a higher score value may be assigned to tokens with a high score (e.g., $t_3$, $t_4$, and $t_{h-1}$), and a lower score value may be assigned to tokens with a low score (e.g., $t_1$, $t_2$, $t_5$, and $t_h$).

The error prediction device may determine arranged scores 1060 by ordering the highlighted scores 1050 from highest to lowest value. The error prediction device may determine an anomaly score based on the scores 1060 in step 1070. More specifically, the error prediction device may determine the anomaly score based on high scores selected from among the top values of the highlighted scores 1050. For example, the error prediction device may determine, as the anomaly value, an average value of scores of tokens (e.g., $t_{h-1}$, $t_4$, and $t_3$) with a high score. The error prediction device may predict an error occurrence likelihood of the computing system based on the determined anomaly score in step 1080. For example, in response to the anomaly score being greater than a threshold value, the error prediction device may predict an occurrence of an error in the computing system in a specific future time interval (e.g., a defined time interval after a specific lead time extending from a generation time of a last log message included in the log data being used for the current error prediction).

Figure 11:
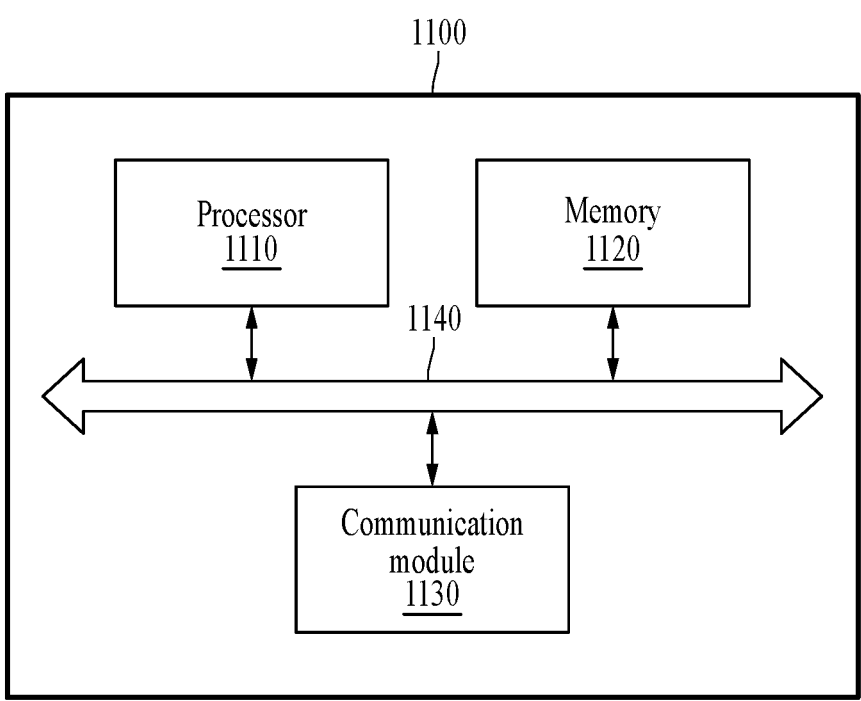
FIG. 11 illustrates an example configuration of a training device according to one or more example embodiments.

FIG. 11 illustrates an example configuration of a training device according to one or more example embodiments.

Referring to FIG. 11, a training device 1100 may train a generator and a discriminator, which are deep learning-based models described herein. The training device 1100 may include a processor 1110, a memory 1120, and a communication module 1130, and each component of the training device 1100 may communicate with each other through a communication bus 1140. In an example embodiment, some of these components (e.g., the communication module 1130) may be omitted or other components may be added to the training device 1100.

The processor 1110 may control other components (e.g., hardware or software components) of the training device 1100 and may perform various types of data processing or operations. In an example embodiment, as at least a portion of the data processing or operations, the processor 1110 may store, instructions or data received from another component in the memory 1120, process the instructions or data stored in the memory 1120, and store resulting data in the memory 1120.

In an example embodiment, the processor 1110 may be a main processor (e.g., a CPU or an application processor (AP)) and/or an auxiliary processor (e.g., a GPU, a neural processing unit (NPU), an image signal processor (ISP), a sensor hub processor, or a communication processor (CP)) that is operable independently of or in conjunction with the main processor.

The memory 1120 may store various data used by at least one component (e.g., the processor 1110 or the communication module 1130) of the training device 1100. The data may include, for example, a program (e.g., an application), and input data or output data for a command related thereto. The memory 1120 may store instructions (or programs) executable by the processor 1110. The memory 1120 may include, for example, a volatile memory or a non-volatile memory.

The communication module 1130 may support the establishment of a direct (or wired) communication channel or a wireless communication channel between the training device 1100 and another device and support the communication through the established communication channel. For example, the communication module 1130 may receive log data from a computing system. The communication module 1130 may include a communication circuit for performing a communication function. The communication module 1130 may include a CP that is operable independently of the processor 1110 and that supports direct (e.g., wired) communication or wireless communication. The communication module 1130 may include a wireless communication module (e.g., a Bluetooth™ communication module, a cellular communication module, a Wi-Fi communication module, or a global navigation satellite system (GNSS) communication module) that performs wireless communication or a wired communication module (e.g., a local area network (LAN) communication module or a power line communication (PLC) module).

The processor 1110 may collect log data of the computing system. The processor 1110 may determine learning data by performing data preprocessing on log data indicating that the computing system is normal among the collected log data. The data preprocessing performed by the processor 1110 may include at least one of, for example, a process of replacing a text corresponding to at least one of special characters or numbers among texts of log messages included in the log data with a predefined token; a process of removing a word token corresponding to a stop word among word tokens of a log message; when log messages of the same text are consecutively duplicated among time-wise log messages included in the log data, a process of unifying the duplicated log messages; a process of grouping the time-wise log messages and generating log message groups; and a process of setting a status value indicated by one or more log messages selected based on a lead time from among the time-wise log messages as a label of a prediction result value corresponding to the learning data.

The processor 1110 may generate learning data including a masked token by performing a masking process that precludes identification of some tokens among a plurality of tokens included in the learning data. The processor 1110 may estimate a replacement token of the masked token, using the generator. The generator may replace the masked token with a replacement token selected from among a plurality of candidate tokens and output the replacement token. The processor 1110 may obtain a first prediction value associated with whether each token of the learning data (which includes the replacement token) corresponds to the replacement token and a second prediction value associated with a masking pattern applied to the masking process, using the discriminator that uses the learning data including the replacement token as an input. The processor 1110 may update parameters (e.g., weights of connections between nodes) of the generator and the discriminator based on the first prediction value and the second prediction value. The processor 1110 may determine a loss based on an output value of the generator and the first prediction value and the second prediction value of the discriminator, and may update the parameters of the generator and the discriminator such that the loss decreases using a backpropagation algorithm.

Figure 12:
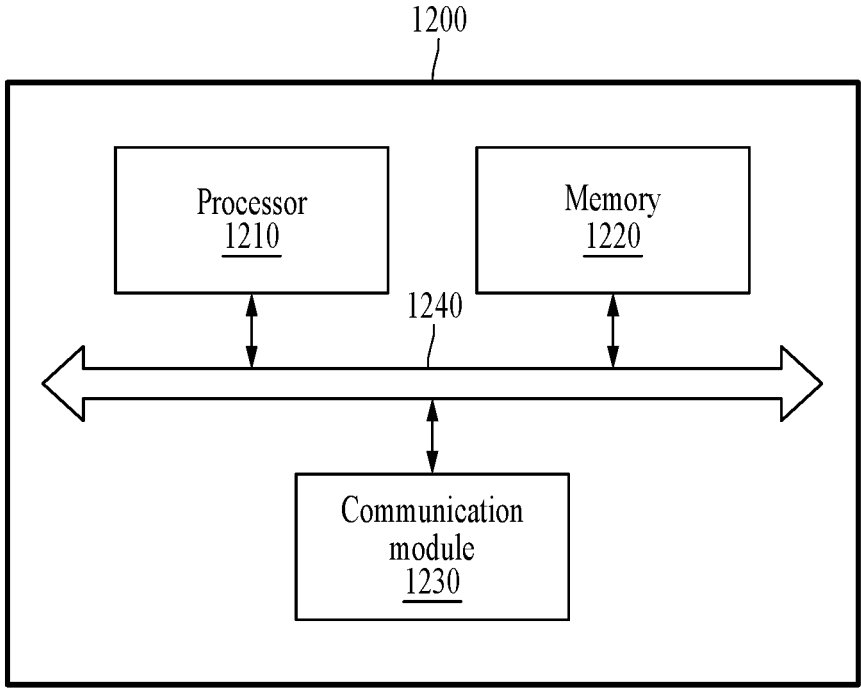
FIG. 12 illustrates an example configuration of an error prediction device according to one or more example embodiments.

FIG. 12 illustrates an example configuration of an error prediction device according to one or more example embodiments.

Referring to FIG. 12, an error prediction device 1200 may predict an error occurrence likelihood of a computing system, which is a likelihood of an occurrence of an error in the computing system, using a discriminator described herein. The error prediction device 1200 may include a processor 1210, a memory 1220, and a communication module 1230, and each component of the error prediction device 1200 may communicate with each other through a communication bus 1240. In an example embodiment, some of the components (e.g., the communication module 1230) may be omitted or other components may be added to the error prediction device 1200.

The processor 1210 may control other components (e.g., hardware or software components) of the error prediction device 1200 and perform various types of data processing or operations. In an example embodiment, as at least a portion of the data processing or operations, the processor 1210 may store instructions or data received from another component in the memory 1220, process the instructions or data stored in the memory 1220, and store resulting data in the memory 1220.

The processor 1210 may be a main processor (e.g., a CPU or an AP) and/or an auxiliary processor (e.g., a GPU, an NPU, an ISP, a sensor hub processor, or a CP) that is operable independently of or in conjunction with the main processor.

The memory 1220 may store various data used by at least one component (e.g., the processor 1210 or the communication module 1230) of the error prediction device 1200. The data may include, for example, a program (e.g., an application), and input data or output data for a command related thereto. The memory 1220 may store instructions (or programs) executable by the processor 1210. The memory 1220 may include a volatile memory or a non-volatile memory.

The communication module 1230 may support the establishment of a direct (or wired) communication channel or a wireless communication channel between the error prediction device 1200 and another device and support the communication through the established communication channel. For example, the communication module 1230 may receive log data from the computing system. The communication module 1230 may include a communication circuit for performing a communication function. The communication module 1230 may include a CP that is operable independently of the processor 1210 and that supports direct (e.g., wired) communication or wireless communication. The communication module 1230 may include a wireless communication module (e.g., a Bluetooth™ communication module, a cellular communication module, a Wi-Fi communication module, or a GNSS communication module) that performs wireless communication or a wired communication module (e.g., a LAN communication module or a PLC module).

The processor 1210 may receive log data generated during an operation of the computing system. In an example embodiment, the processor 1210 may perform data preprocessing on the log data. The data preprocessing performed by the processor 1210 may include at least one of, for example, a process of replacing a text corresponding to at least one of special characters or numbers among texts of log messages included in the log data with a predefined token; a process of removing a word token corresponding to a stop word among word tokens of a log message; when log messages of the same text are consecutively duplicated among time-wise log messages included in the log data, a process of unifying the duplicated log messages; a process of grouping the time-wise log messages and generating log message groups; and a process of grouping the time-wise log messages and generating log message groups.

A score associated with whether each token included in the log data is an anomaly token may be obtained using the discriminator. The processor 1210 may group the time-wise log messages included in the log data and generate the log message groups, and sequentially input each log message group in the log message groups to the discriminator to obtain scores corresponding to the log message groups from the discriminator.

The processor 1210 may determine highlighted scores obtained through a highlighting process performed on the scores of the tokens. The processor 1210 may determine the highlighted scores by adjusting the scores of the tokens such that a standard deviation of the scores of the tokens increases. The processor 1210 may determine an anomaly score based on the highlighted scores. For example, the processor 1210 may determine the anomaly score based on some of top scores selected in an order starting from the highest score among the highlighted scores. The processor 1210 may estimate an error occurrence likelihood of the computing system based on the anomaly score. For example, in response to the anomaly score being greater than a threshold value, the processor 1210 may predict an occurrence of an error in the computing system.

The example embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as, parallel processors.

The computing apparatuses, the electronic devices, the processors, the memories, the displays, the information output system and hardware, the storage devices, and other apparatuses, devices, units, modules, and components described herein with respect to FIGS. 1-12 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. A computer-implemented method of predicting errors in a computing system, the method comprising:
receiving, by a communication circuit, log data generated by the computing system during operation of the computing system;
tokenizing, by a processor, the log data into tokens;
inputting, by the processor, the tokens to a discriminator model which generates scores of the tokens, respectively, each score corresponding to a probability that a corresponding token is an anomaly token;
performing, by the processor, a sharpening process on the scores, wherein the sharpening process adjusts the scores such that a standard deviation of the scores increases;
determining, by the processor, an anomaly score based on the scores to which the sharpening process has been performed; and
determining, by the processor, a likelihood of future occurrence of an error in the computing system based on the anomaly score,
wherein the discriminator model is a neural network model configured to determine a score of the corresponding token.

2. The method of claim 1, wherein the discriminator model is the neural network model configured to determine one of the scores of a corresponding one of the tokens based on a likelihood that the corresponding one of the tokens is an anomaly token.

3. The method of claim 1, wherein the determining the anomaly score comprises selecting a set of highest scores from among the scores to which the sharpening process has been performed.

4. The method of claim 3, wherein the determining the anomaly score further comprises determining, as the anomaly score, an average value of the selected highest scores.

5. The method of claim 1, wherein the determining the likelihood comprises, in response to the anomaly score being greater than a threshold value, predicting future occurrence of an error in the computing system.

6. The method of claim 1, further comprising performing preprocessing on the log data, wherein the preprocessing comprises at least one of:
replacing special characters or numbers in the log data with a token that represent all special characters or numbers;
consolidating consecutive log messages determined to be duplicates after the replacing; and
after the consolidating, forming log message groups of chronologically consecutive log messages, and determining likelihoods of future errors of the computing system for the log message groups, respectively, by applying the log message groups to the discriminator model.

7. The method of claim 1, wherein the generating the scores comprises:
forming log message groups by grouping chronologically consecutive log messages comprised in the log data; and
obtaining anomaly scores respectively corresponding to the log message groups from the discriminator model by sequentially inputting each log message group to the discriminator model.

8. The method of claim 1, wherein the log data comprises log messages, and each log message comprises respective time information about a time at which the each respective log message is generated or a time at which an event logged to the each respective log message occurred.

9. The method of claim 8, wherein each log message comprises a status message describing a state of the computing system, a predefined code identifier corresponding to a state of the computing system, or a predefined numeric identifier corresponding to a state of the computing system.

10. The method of claim 1, wherein the discriminator model is paired with a generator model to form a discriminator-generator model, and generating, by the discriminator model, from training log data from the computing system, training tokens used for training the discriminator model.

11. A computing device for predicting errors in a computing system, comprising:

a communication circuit configured to communicate with the computing system;

a processor; and memory storing instructions configured to cause the computing device to:

receive, by the communication circuit, log data generated by the computing system during operation of the computing system, the log data comprising tokens;

input the tokens to a discriminator model which generates scores of the respect tokens, respectively, each score corresponding to a probability that a corresponding token is an anomaly token;

perform a sharpening process on the scores, wherein the sharpening process adjusts the scores such that a standard deviation of the scores increases;

determine an anomaly score based on the scores to which the sharpening process has been performed; and determine a likelihood of future occurrence of an error in the computing system based on the anomaly score, wherein the discriminator model is a neural network model configured to determine a score of the corresponding token.

12. The computing device of claim 11, wherein the instructions are further configured to cause the computing device to determine the anomaly score based a set of highest scores selected from among the scores that the sharpening process is performed.

13. The computing device of claim 11, wherein the instructions are further configured to cause the one or more processors to, in response to the anomaly score being greater than a threshold value, predict future occurrence of an error in the computing system.

14. The computing device of claim 11, wherein the instructions are further configured to cause the computing device to preprocess the log data, wherein the preprocessing comprises:

replacing, with a predefined token, special characters and numbers in text of a log message in the log data;

removing a word token corresponding to a stop word among word tokens of the log message; or when, among time-ordered log messages comprised in the log data, log messages of a same text are consecutively duplicated, consolidating the duplicated log messages; and generating log message groups by grouping the time-ordered log messages.

15. The computing device of claim 11, wherein the instructions are further configured to cause the computing device to:

generate log message groups by grouping time-ordered log messages comprised in the log data; and obtain scores respectively corresponding to the log message groups from the discriminator by sequentially inputting each log message group to the discriminator model.

16. A method, comprising:

collecting log data of a computing system;

generating training data comprising tokens by performing preprocessing on log data, among the collected log data, indicating normal state of the computing system;

further generating the training data by performing a masking process that precludes some of the tokens from being identifiable;

estimating replacement tokens for masked tokens using a generator model;

inputting the training data, including the replacement tokens, to a discriminator model that performs inference thereon to:

generate first prediction values of whether tokens of the training data, including the replacement tokens, are replacement tokens and generate second prediction values of which masking patterns were applied during the masking process; and updating parameters of the generator model and the discriminator model based on the first prediction values and the second prediction values.

17. The method of claim 16, wherein the replacement tokens are randomly selected from a dictionary.

18. The method of claim 16, wherein the generator model and the discriminator model each comprise an encoder of a transformer model, and wherein the generator model is configured to replace a masked token with a replacement token selected from among a plurality of candidate tokens and output the replacement token.

\* \* \* \* \*